(12) United States Patent
Carrig, Jr. et al.

(10) Patent No.: US 6,898,328 B2
(45) Date of Patent: May 24, 2005

(54) METHOD AND APPARATUS FOR ADAPTIVE PIXEL ESTIMATION UNDER HIGH ERROR RATE CONDITIONS

(75) Inventors: James J. Carrig, Jr., San Jose, CA (US); Marco Paniconi, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 129 days.

(21) Appl. No.: 10/279,354

(22) Filed: Oct. 23, 2002

(65) Prior Publication Data

US 2004/0081365 A1 Apr. 29, 2004

(51) Int. Cl.[7] .............................................. G06K 9/40
(52) U.S. Cl. ................. 382/261; 348/404.1; 348/408.1; 348/409.1; 375/240.11; 375/240.27; 375/240.29; 382/159; 382/224; 382/275; 382/300
(58) Field of Search .......................... 348/402.1, 404.1, 348/407.1, 408.1, 409.1, 413.1, 416.1; 375/240.11, 240.27, 240.29; 382/155–159, 224–225, 260–265, 274–275, 300

(56) References Cited

U.S. PATENT DOCUMENTS

| | | | | |
|---|---|---|---|---|
| 5,631,979 A | * | 5/1997 | Cok ........................... | 382/263 |
| 5,936,676 A | * | 8/1999 | Ledinh et al. .............. | 348/452 |
| 6,002,801 A | * | 12/1999 | Strongin et al. ............. | 382/233 |
| 6,075,538 A | * | 6/2000 | Shu et al. .................... | 345/419 |
| 6,091,767 A | * | 7/2000 | Westerman ................. | 375/240 |
| 6,192,079 B1 | * | 2/2001 | Sharma et al. ......... | 375/240.16 |
| 6,317,459 B1 | * | 11/2001 | Wang .................... | 375/240.12 |
| 6,351,494 B1 | | 2/2002 | Kondo et al. | |
| 6,449,393 B1 | * | 9/2002 | Peters ......................... | 382/239 |
| 6,535,643 B1 | * | 3/2003 | Hong ......................... | 382/232 |
| 6,661,842 B1 | * | 12/2003 | Abousleman .......... | 375/240.11 |
| 6,681,054 B1 | * | 1/2004 | Gindele ...................... | 382/272 |

FOREIGN PATENT DOCUMENTS

| | | |
|---|---|---|
| WO | WO 01/24105 A1 | 4/2001 |
| WO | WO 01/43069 A2 | 6/2001 |

OTHER PUBLICATIONS

Thomas Strohmer, *Computationally Attractive Reconstruction of Bandlimited Images from Irregular Samples,* IEEE Transactions on Image Processing, vol. 6, No. 4, Apr. 1997.

Pina Marziliano et al, *Reconstruction of Irregularly Sampled Discrete–Time Bandlimited Signals with Unknown Sampling Locations,* IEEE Transactions on Signal Processing, vol. 48, No. 12, Dec. 2000.

Strohmer, "Computationally Attractive Reconstruction of Bandlimited Images from Irregular Samples", IEEE Transactions on Image Processing, Vo.6, No. 4, Apr. 1997.

Marziliano, et al., "Reconstruction of Irregularly Sampled Discrete–Time Bandlimited Siganls with Unknown Sampling Locations", IEEE Transactions on Signal Processing, vol. 48, No. 12, Dec. 2000.

* cited by examiner

*Primary Examiner*—Bhavesh M. Mehta
*Assistant Examiner*—Gregory Desire
(74) *Attorney, Agent, or Firm*—Blakely, Sokoloff, Taylor & Zafman LLP

(57) ABSTRACT

A method and apparatus for adaptive pixel estimation under high error rate conditions are disclosed. Classes are created, feasible classes are determined, and an optimal filter is applied to perform the pixel estimation.

25 Claims, 5 Drawing Sheets

METHOD AND APPARATUS FOR ADAPTIVE PIXEL ESTIMATION UNDER HIGH ERROR RATE CONDITIONS

FIELD OF THE INVENTION

The present invention pertains to image processing. More particularly, the present invention relates to a method and apparatus for adaptive pixel estimation under high error rate conditions.

BACKGROUND OF THE INVENTION

Techniques proposed in the past for pixel error recovery and post-process improvement due to quantization effects from coding, often used a three stage approach. The first stage provided rough concealment for an entire image frame using an elementary interpolation procedure. The second stage improved the frame by revisiting every erroneous pixel and using neighboring data to select a filter based upon a local spatial, motion, and error classification. Corresponding to each classification, one estimation filter was prepared in advance. The third stage applied a fixed smoothing filter to reduce quantization effects.

Filters prepared in advance severely limit the number of error patterns (missing pixel patterns) that may be considered. To compensate for this, past techniques may have used a sub-optimal rough recovery state. Pixel recovery and pixel improvement being separate processes requires a longer time to process. These present problems.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for adaptive pixel estimation under high error rate conditions are described.

The present invention in one embodiment is a custom algorithm, and architecture to improve on the past techniques in several ways. First, for each pixel in the image to be recovered and improved, a custom filter is generated in real-time versus in the past, where filters were prepared in advance severely limiting the number of error patterns (missing pixel patterns) that could be considered. To compensate for this, past techniques used a sub-optimal rough recovery stage, which may be eliminated from the process in one embodiment of the present invention.

In another embodiment of the invention, a second improvement is the incorporation of both pixel recovery and improvement into a single one-pass process. This may reduce processing delay (since it is now single pass), and may numerically improve the result by adding adaptation to the smoothing process and by possibly eliminating the intermediate finite precision results.

Mathematical Review

One technique for designing estimation filters is to use training to determine the least squares optimal filter over a pre-determined set of images. The training data may be accumulated into an observation matrix, A, and a vector of desired responses, b. We quickly review these quantities, their use, and issues regarding their efficient application for the benefit of the reader.

Figure 3:
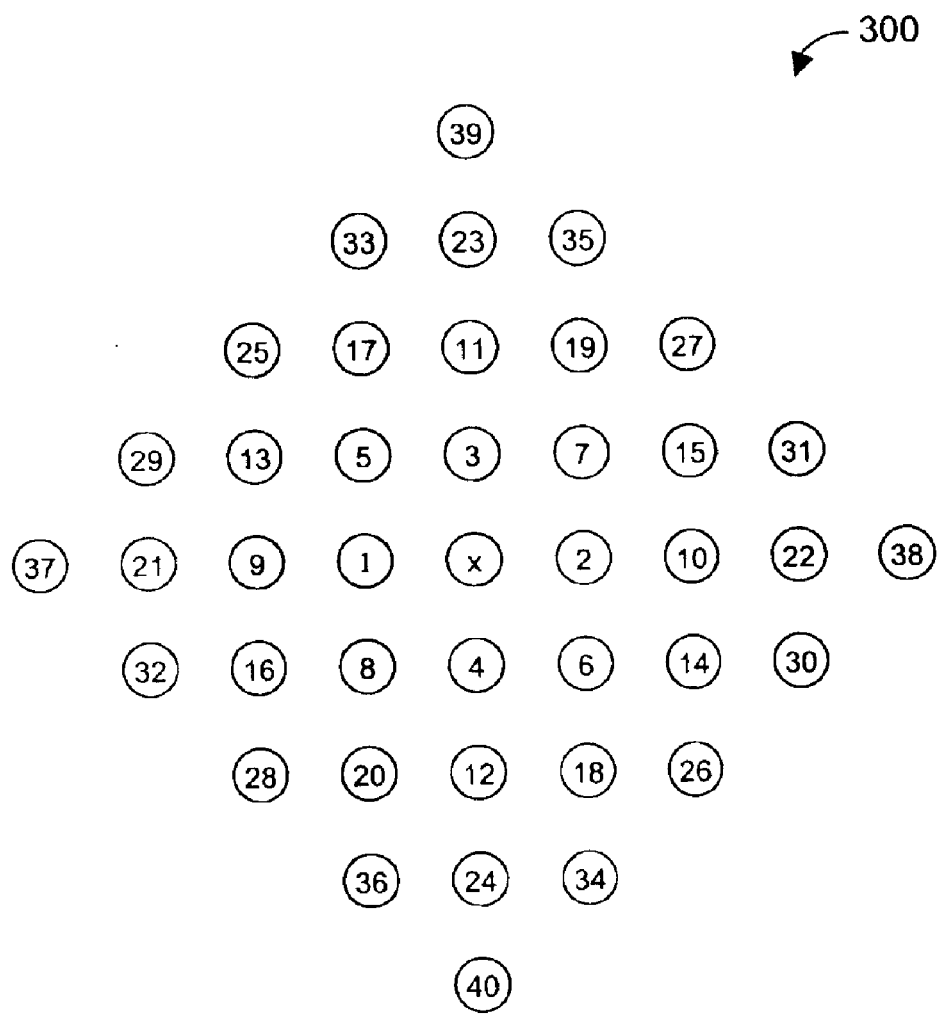
FIG. 3 illustrates one embodiment of a possible training tap numbered in a sequence that indicates each positions supposed importance in estimating a pixel near the center tap.

Consider, for example, the estimation tap 300 shown in FIG. 3 where the pixels numbered 1 through 40 represent pixels which might be used to estimate the center pixel, labeled x. Each time this tap is filled with image data, it may add one row to the matrix A and the vector b. Specifically, the 40 observation pixels are arranged in the sequence indicated by the numbering in FIG. 3, and the value x contributes one row to the vector b. At the end of training there is the m-by-40 matrix A and the m element vector b, where m is the number of trainings. The least squares optimal filter is found by minimizing $$\|Ax-b\|_2^2 \qquad (1)$$

with respect to x (if the solution is not unique, we choose the minimum norm solution). The solution vector, $x_{LS}$ provides the coefficients of the optimal filter.

Instead of accumulating and storing the matrix A and the vector b, it is possible to alternatively accumulate and store the matrix $R=A^T A$ and the vector $y=A^T b$. This is sufficient since $x_{LS}$ is also the minimum norm solution to $$Rx_{LS}=y \qquad (2)$$

Each training pixel normally contributes a new row to A and b. This is equivalent to updating R and y as follows:

$$R_{k+1}=R_k+a_{k+1}a_{k+1}^T \qquad (3)$$

$$y_{k+1}=y_k+b_{k+1}a_{k+1}^T \qquad (4)$$

where $a^T_k$ is row k of the matrix A, and $b_k$ is row k of the vector b and the subscripts on R and y indicate the number of updates. $R_0$ and $y_0$ are defined to have all components equal to zero. To guard against overflow, it is possible to store scaled versions of R and y, as long as the same scale factor is used for each, since the scale factor α cancels in the equation:

$$\alpha Rx_{LS}=\alpha y. \qquad (5)$$

Suppose that $R_m$ and $y_m$ have been accumulated and now the optimal filter defined over a subset of the training taps is to be found. Each tap corresponds to one column of the matrix A. If a tap cannot be used, a smaller system may be defined by removing the corresponding column of A. Equivalently, it is possible to remove the corresponding rows and columns of the matrix $R_m$ and $y_m$.

Suppose that $R_m$ and $y_m$ have been accumulated for two different sets of training data and this information is to be merged into one large set. For notational purposes, a numbered superscript is used to denote these separate training classes. For example, $R_m^{(1)}$ indicates a matrix accumulated over training set 1, consisting of m training samples. Training data may be combined by simply adding their training matrices, multiplied by an appropriate weight (usually, the number of training samples, or a percentage of total training samples). For example, $$R = \frac{m_1}{m_1+m_2} R_{m_1}^{(1)} + \frac{m_2}{m_1+m_2} R_{m_2}^{(2)} \qquad (6)$$

$$y = \frac{m_1}{m_1+m_2} y_{m_1}^{(1)} + \frac{m_2}{m_1+m_2} y_{m_2}^{(2)} \qquad (7)$$

Algorithmic Description with Examples

One embodiment of the present invention is described below in detail as an algorithmic technique. Incorporated in this description, are detailed examples based on the following data and filter taps. In the example, fairly small taps are used so that all the numbers involved may be shown so as to avoid obscuring the invention.

Assume that the following previous frame data, has already been received and processed by the output device (the decoder).

Previous frame data: recovered

| 133 | 136 | 103 |
|---|---|---|
| 156 | 146 | 103 |
| 89  | 84  | 70  |

The following data represents the answer, that is, pixel values that are trying to be achieved.

Current frame data: original (not known to decoder)

| 136 | 122 | 59 |
|---|---|---|
| 159 | 131 | 62 |
| 92  | 79  | 46 |

The following data represents a quantized and damaged version of the current frame data resulting from decompression with lost pixels. N/A indicates pixel values that were not available due to some transmission loss. In case 1, the decoder will apply a filter in the hopes of improving the center value to make it more like that shown in the answer above.

Current frame data: quantized and damaged (case 1: improvement)

| 131 | 112 | 49  |
|---|---|---|
| 159 | 110 | N/A |
| 97  | 68  | 37  |

In case 2, assume that the center pixel has also been lost and so the encoder must recover it using only the available data.

Current frame data: quantized and damaged (case 2: recovery)

| 131 | 112 | 49  |
|---|---|---|
| 159 | N/A | N/A |
| 97  | 68  | 37  |

Furthermore, in this example, assume that the local motion is measured using a tap with shape

| o | o | o |
|---|---|---|
| o | o | o |
| o | o | o | centered on the pixel of interest and defined on the current and previous frames. Next, measure spatial texture, using a tap with shape

|   | o |   |
|---|---|---|
| o | o | o |
|   | o |   | centered on the pixel of interest and defined only on the current frame. In a real system, the tap might also be defined on a previous frame, however the number of taps in this example is limited to keep the matrices to a size suitable for printing. Next apply a filter using a tap with shape

| o | o | o |
|---|---|---|
| o | o | o |
| o | o | o | centered on the pixel of interest and defined on the current frame. In each case, use only the available pixels. Training matrix data is arranged in rows and columns where the row/column number corresponds to tap positions in the following scanning order:

| | | |
|---|---|---|
| 1 | 2 | 3 |
| 4 | 5 | 6 |
| 7 | 8 | 9 |

1: Determine Feasible Motion Classes

Assume that the pixels being recovered are part of a video sequence, then performance may be enhanced through the use of motion classes or motion compensation. One example of motion classification is an average absolute pixel difference between the current and previous frame being computed and thresholded to determine a motion class, MC=0, 1, 2, or 3. Erroneous pixels are eliminated from this process. For example, in case 1, the average absolute difference is computed between the current and previous frames using the 8 pairs of undamaged pixels to be 22. Without loss of generality, assume that pixels with an average difference of more than 13 and less than 25 belong to motion class 2, then the motion class (MC) can be set at MC=2. Similarly, in case 2, computing the average absolute difference between the current and previous frames using the 7 pairs of undamaged pixels results in 20. Again, the result falls into motion class 2.

2: Determine Feasible Spatial Classes

In contrast with some techniques where damaged pixels in the class tap were estimated in the first pass and then this estimated value was used in the classification step and errors remaining in the first estimation pass could cause errors in classification, the present invention creates a list of feasible spatial classes. Assume that the spatial class is defined as follows. Take the average value, using the 5 pixels that form a plus sign surrounding the pixel of interest. For example, in case 1, use:

| | | |
|---|---|---|
|  | 112 |  |
| 159 | 110 | N/A |
|  | 68 |  | and compute the average to be 112.25. Any pixel value greater than the average is assigned a 1, otherwise a 0, and these binary digits are scanned in order to form a digit. In this case, comparing the above values to 112.25, results in

| | | |
|---|---|---|
|  | 0 |  |
| 1 | 0 | N/A |
|  | 0 |  |

When scanned (left to right and top to bottom), this forms the digit 010x0, where x indicates the proper value is not known (i.e. N/A). Instead of forcing the assignment to a unique spatial class, make a list of all possible spatial classes that are consistent with the error. Thus, it cam be seen that the proper class is either 01000 (=8) or 01010 (=10), depending upon whether the x is a 0 or a 1.

Similarly, in case 2, the calculated the mean as 113, and apply the threshold to get

| | | |
|---|---|---|
|  | 0 |  |
| 1 | N/A | N/A |
|  | 0 |  | forming the binary number 01xx0. Thus the spatial class can be 01000 (=8), (01010 (=10), 01100 (=12), or 01110 (=14). Since there are two missing bits, there are 4 possible classes.

3: Determine Feasible Classes

Combine the results of 1: and 2: above to determine all possible classes. For example, the overall class might be defined as $$ClassID = 4 \times SC + MC.$$

For example, if MC is 2, and SC is one of 8 or 10, as in case 1, then the class ID is one of 4*8+2=34 or 4*10+2=42. Similarly, in case 2 the possible class ID's are 34, 42, 50, or 58.

4: Merge Matrices from Feasible Classes

Now consider how to merge the information from all feasible classes by applying Eqs. (6) and (7). Assume the following training matrices are prepared in advance and stored in ROM.

Class ID=34, trained on 48000 samples.

$$R^{(34)} = \begin{bmatrix} 1.0000 & 0.9973 & 0.9932 & 0.9925 & 0.9907 & 0.9882 & 0.9876 & 0.9863 & 0.9846 \\ 0.9973 & 1.0000 & 0.9973 & 0.9914 & 0.9925 & 0.9907 & 0.9874 & 0.9876 & 0.9863 \\ 0.9932 & 0.9973 & 1.0000 & 0.9893 & 0.9914 & 0.9925 & 0.9866 & 0.9874 & 0.9876 \\ 0.9925 & 0.9914 & 0.9893 & 1.0000 & 0.9973 & 0.9932 & 0.9925 & 0.9907 & 0.9882 \\ 0.9907 & 0.9925 & 0.9914 & 0.9973 & 1.0000 & 0.9973 & 0.9914 & 0.9925 & 0.9907 \\ 0.9882 & 0.9907 & 0.9925 & 0.9932 & 0.9973 & 1.0000 & 0.9893 & 0.9914 & 0.9925 \\ 0.9876 & 0.9874 & 0.9866 & 0.9925 & 0.9914 & 0.9893 & 1.0000 & 0.9973 & 0.9932 \\ 0.9863 & 0.9876 & 0.9874 & 0.9907 & 0.9925 & 0.9914 & 0.9973 & 1.0000 & 0.9973 \\ 0.9846 & 0.9863 & 0.9876 & 0.9882 & 0.9907 & 0.9925 & 0.9932 & 0.9973 & 1.0000 \end{bmatrix}$$

$$y^{(34)} = \begin{bmatrix} 0.9907 \\ 0.9925 \\ 0.9914 \\ 0.9973 \\ 1.0000 \\ 0.9973 \\ 0.9914 \\ 0.9925 \\ 0.9907 \end{bmatrix}$$

Class ID=42, trained on 24000 samples.

$$R^{(42)} = \begin{bmatrix} 1.0000 & 0.9984 & 0.9963 & 0.9980 & 0.9966 & 0.9947 & 0.9939 & 0.9926 & 0.9910 \\ 0.9984 & 1.0000 & 0.9984 & 0.9965 & 0.9980 & 0.9966 & 0.9925 & 0.9939 & 0.9926 \\ 0.9963 & 0.9984 & 1.0000 & 0.9945 & 0.9965 & 0.9980 & 0.9908 & 0.9925 & 0.9939 \\ 0.9980 & 0.9965 & 0.9945 & 1.0000 & 0.9984 & 0.9963 & 0.9980 & 0.9966 & 0.9947 \\ 0.9966 & 0.9980 & 0.9965 & 0.9984 & 1.0000 & 0.9984 & 0.9965 & 0.9980 & 0.9966 \\ 0.9947 & 0.9966 & 0.9980 & 0.9963 & 0.9984 & 1.0000 & 0.9945 & 0.9965 & 0.9980 \\ 0.9939 & 0.9925 & 0.9908 & 0.9980 & 0.9965 & 0.9945 & 1.0000 & 0.9984 & 0.9963 \\ 0.9926 & 0.9939 & 0.9925 & 0.9966 & 0.9980 & 0.9965 & 0.9984 & 1.0000 & 0.9984 \\ 0.9910 & 0.9926 & 0.9939 & 0.9947 & 0.9966 & 0.9980 & 0.9963 & 0.9984 & 1.0000 \end{bmatrix}$$

$$y^{(42)} = \begin{bmatrix} 0.9966 \\ 0.9980 \\ 0.9965 \\ 0.9984 \\ 1.0000 \\ 0.9984 \\ 0.9965 \\ 0.9980 \\ 0.9966 \end{bmatrix}$$

Class ID=50, trained on 38400 samples.

$$R^{(50)} = \begin{bmatrix} 1.0000 & 0.9988 & 0.9972 & 0.9983 & 0.9972 & 0.9957 & 0.9949 & 0.9939 & 0.9927 \\ 0.9988 & 1.0000 & 0.9988 & 0.9974 & 0.9983 & 0.9972 & 0.9941 & 0.9949 & 0.9939 \\ 0.9972 & 0.9988 & 1.0000 & 0.9960 & 0.9974 & 0.9983 & 0.9930 & 0.9941 & 0.9949 \\ 0.9983 & 0.9974 & 0.9960 & 1.0000 & 0.9988 & 0.9972 & 0.9983 & 0.9972 & 0.9957 \\ 0.9972 & 0.9983 & 0.9974 & 0.9988 & 1.0000 & 0.9988 & 0.9974 & 0.9983 & 0.9972 \\ 0.9957 & 0.9972 & 0.9983 & 0.9972 & 0.9988 & 1.0000 & 0.9960 & 0.9974 & 0.9983 \\ 0.9949 & 0.9941 & 0.9930 & 0.9983 & 0.9974 & 0.9960 & 1.0000 & 0.9988 & 0.9972 \\ 0.9939 & 0.9949 & 0.9941 & 0.9972 & 0.9983 & 0.9974 & 0.9988 & 1.0000 & 0.9988 \\ 0.9927 & 0.9939 & 0.9949 & 0.9957 & 0.9972 & 0.9983 & 0.9972 & 0.9988 & 1.0000 \end{bmatrix}$$

$$y^{(50)} = \begin{bmatrix} 0.9972 \\ 0.9983 \\ 0.9974 \\ 0.9988 \\ 1.0000 \\ 0.9988 \\ 0.9974 \\ 0.9983 \\ 0.9972 \end{bmatrix}$$

Class ID=58, trained on 58560 samples.

$$R^{(58)} = \begin{bmatrix} 1.0000 & 0.9950 & 0.9879 & 0.9908 & 0.9874 & 0.9825 & 0.9847 & 0.9820 & 0.9784 \\ 0.9950 & 1.0000 & 0.9950 & 0.9871 & 0.9908 & 0.9874 & 0.9816 & 0.9847 & 0.9820 \\ 0.9879 & 0.9950 & 1.0000 & 0.9820 & 0.9871 & 0.9908 & 0.9777 & 0.9816 & 0.9847 \\ 0.9908 & 0.9871 & 0.9820 & 1.0000 & 0.9950 & 0.9879 & 0.9908 & 0.9874 & 0.9825 \\ 0.9874 & 0.9908 & 0.9871 & 0.9950 & 1.0000 & 0.9950 & 0.9871 & 0.9908 & 0.9874 \\ 0.9825 & 0.9874 & 0.9908 & 0.9879 & 0.9950 & 1.0000 & 0.9820 & 0.9871 & 0.9908 \\ 0.9847 & 0.9816 & 0.9777 & 0.9908 & 0.9871 & 0.9820 & 1.0000 & 0.9950 & 0.9879 \\ 0.9820 & 0.9847 & 0.9816 & 0.9874 & 0.9908 & 0.9871 & 0.9950 & 1.0000 & 0.9950 \\ 0.9784 & 0.9820 & 0.9847 & 0.9825 & 0.9874 & 0.9908 & 0.9879 & 0.9950 & 1.0000 \end{bmatrix}$$

$$y^{(58)} = \begin{bmatrix} 0.9874 \\ 0.9908 \\ 0.9871 \\ 0.9950 \\ 1.0000 \\ 0.9950 \\ 0.9871 \\ 0.9908 \\ 0.9874 \end{bmatrix}$$

Continuing with the examples, consider what the training result would be if the unknown bits had not been used to define the classification. In that case, classes 34 and 42 would have been united as one class. According to Eqs. (6) and (7) it is possible to form the training matrices for this united class simply by adding the weighted training matrices and using this combined data to develop a least squares optimal filter. In case 1, form $$R = (2/3)R^{(34)} + (1/3)R^{(42)}$$

and $$y = (2/3)y^{(34)} + (1/3)y^{(42)}$$

In case 2, form $$R = 0.28409 R^{(34)} + 0.14205 R^{(42)} + 0.22727 R^{(50)} + 0.34659 R^{(58)}$$

and $$y = 0.28409 y^{(34)} + 0.14205 y^{(42)} + 0.22727 y^{(50)} + 0.34659 y^{(58)}$$

5: Extract Submatrix for Filter Estimation

In case 1, the pixel in row 2, column 3 is not available. Since this corresponds to position number 6, we remove row 6 and column 6 from R and row 6 from y. In case 2, pixels in row 2, columns 2 and 3 are not available. Since these correspond to positions 5 and 6, we remove rows and columns 5 and 6 from R and rows 5 and 6 from y.

6: Form the LS Optimal Filter, Based on Training

Once the reduced training matrices that correspond only to undamaged data points are available, form the least squares optimal filter by finding the minimum norm solution to Eq. (2).

In case 1, solve an 8-by-8 system to obtain the filter

| | | |
|---|---|---|
| −0.0478660 | 0.0588177 | −0.0180069 |
| 0.0695816 | 0.9194729 | N/A |
| −0.0282933 | 0.0513595 | −0.0038462 |

In case 2, solve a 7-by-7 system to obtain the filter

| | | |
|---|---|---|
| −0.3732434 | 0.4361604 | 0.0082201 |
| 0.8240423 | N/A | N/A |
| −0.3457898 | 0.4553740 | −0.0032269 |

7: Apply the Filter to Estimate the Data

The filter is then applied to form an estimate of the missing pixel and the procedure continues to the next damaged pixel. In case 1, an estimate of 112.25 is obtained. In case 2, an estimate of 128.69 is obtained. Note that in case 1—the improvement case—the center tap has a very large value implying that the existing value is the most critical value. This inhibits large changes from the existing value.

Figure 4:
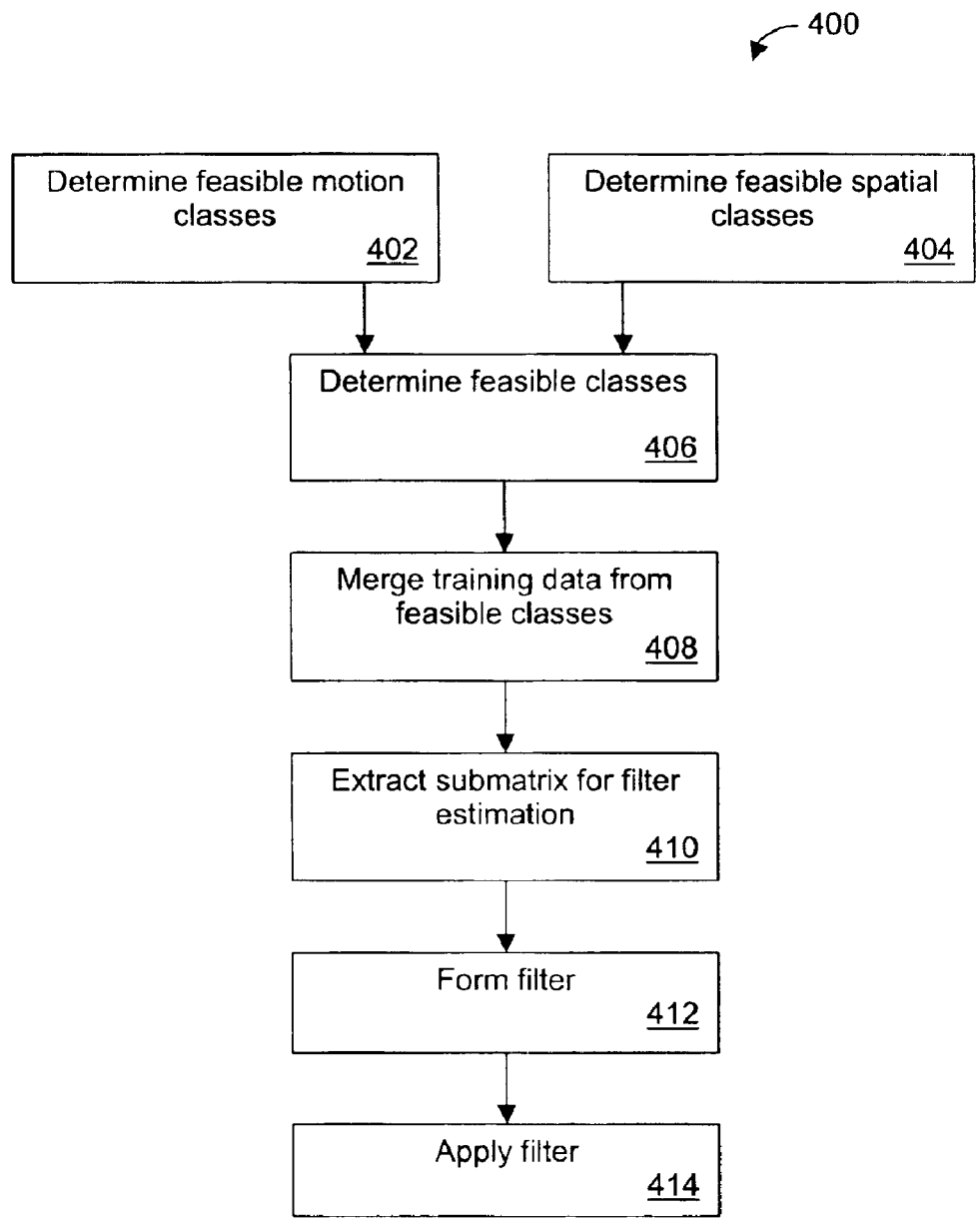
FIG. 4 illustrates one embodiment of an algorithm flow for recovering damaged pixels in a video stream.

FIG. 4 shows a possible algorithm flow 400 for processing video. In the case of video, the motion, spatial, and filter taps are defined in 3 dimensions. For example, the tap shown in FIG. 3 might be applied to the current and previous frames, forming a 3 dimensional filter.

In one instantiation of block 402 (Determine feasible motion classes), the determination might consist of computing the average of the absolute pixel differences (or 0 if no pixels are available). In this case, there is always exactly one feasible motion class.

At 402 feasible motion classes are determined. At 404 feasible spatial classes are determined. At 406 feasible classes are determined from the feasible motion classes 402 and the feasible spatial classes 404. Next, the training data from the feasible classes (determined at 406) are merged 408. Next, at 410 a submatrix is extracted for filter estimation. A filter is formed 412, and applied 414.

Figure 5:
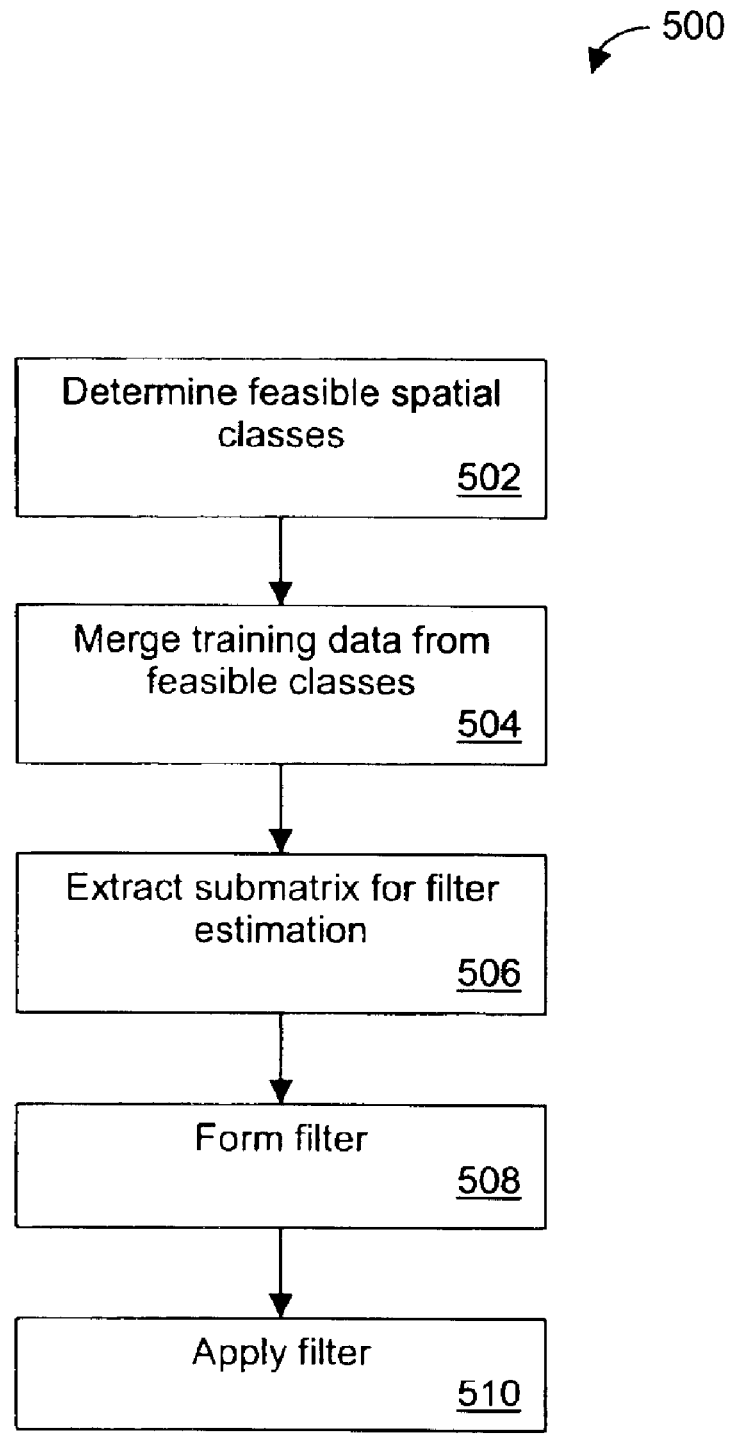
FIG. 5 illustrates one embodiment of an algorithm flow for recovering damaged pixels in still images.

FIG. 5 shows a possible algorithm flow 500 for processing still images. In this case, there is no motion class determination and the filters are defined in two dimensions only.

At 502 feasible spatial classes are determined. Next, the training data from the feasible classes (determined at 502) are merged 504. At 506 a submatrix is extracted for filter estimation. A filter is formed 508, and applied 510.

Implementation with Limited Resources

Given an amount of computing power, one would normally use as many taps as possible. To do this, one embodiment might first define a large domain of possible tap positions (such as shown in FIG. 3, for example), and then select a subset of these to use.

Assume enough computing power to use a K tap estimation filter to estimate the missing pixel data. Next, select the most important K taps from all the available data. To do this, check the availability of undamaged data for the filter tap according to the order shown in FIG. 3. Once K taps have been selected, extract the corresponding rows and columns of R and rows of y (as illustrated above in 5: Extract submatrix for filter estimation) to form the reduced system.

Implementation in a Parallel Memory

The large number of computations in this procedure and the independence of each pixel recovery suggest a massively parallel implementation could be effectively utilized using a simple divide and conquer strategy. For example, in one embodiment, a smart memory where each cell was capable of identifying its possible class ID's according to the above strategy might be built. Processing could begin by broadcasting the reference R and y data from a shared ROM. Each cell could save the data corresponding to its own interest. Independently, each cell could solve for its own optimal filter and apply it to fix the damaged data. Then the corrected data could be shifted out and the next damaged image portion could be shifted in.

Thus, what has been described is a method and apparatus for adaptive pixel estimation under high error rate conditions.

Figure 1:
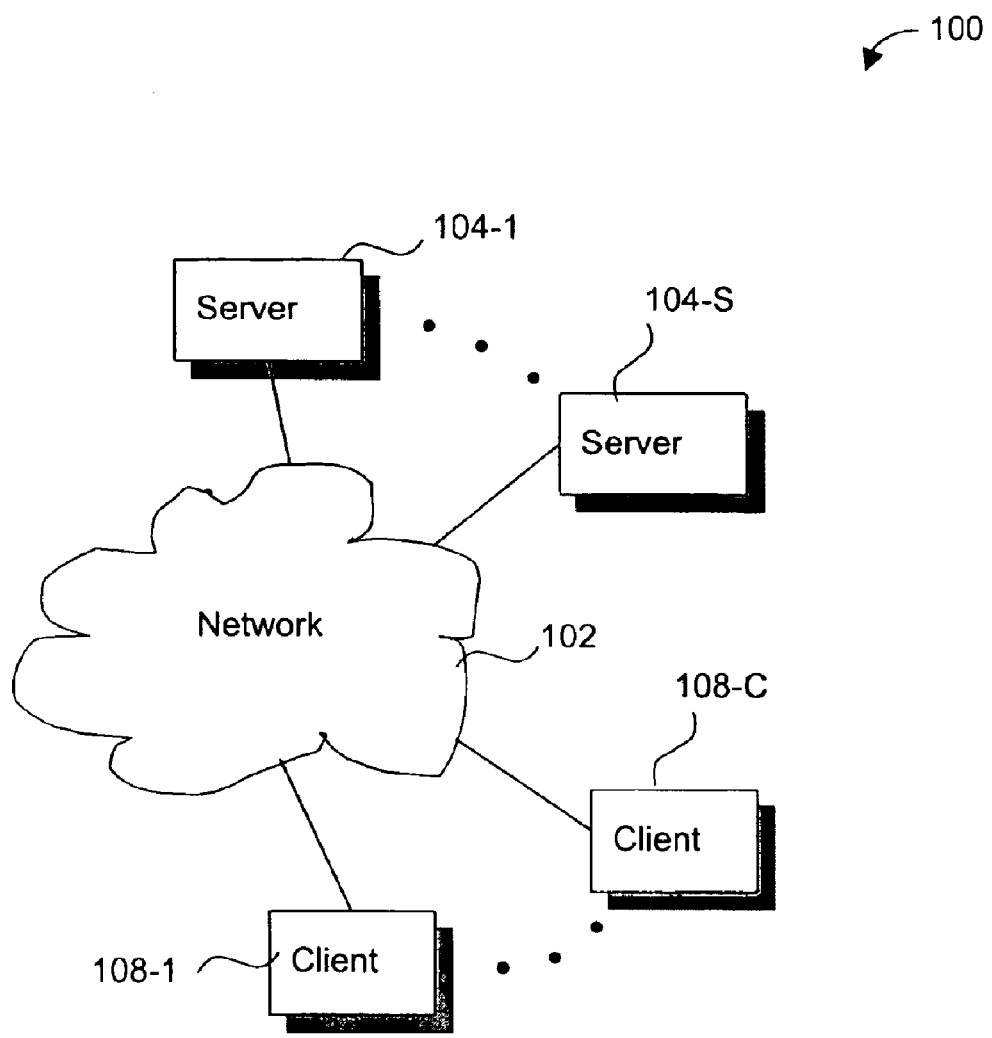
FIG. 1 illustrates a network environment in which the method and/or apparatus of the present invention may be implemented.

FIG. 1 illustrates a network environment 100 in which the techniques described may be applied. As shown, several computer systems in the form of S servers 104-1 through 104-S and C clients 108-1 through 108-C are connected to each other via a network 102, which may be, for example, a home based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Figure 2:
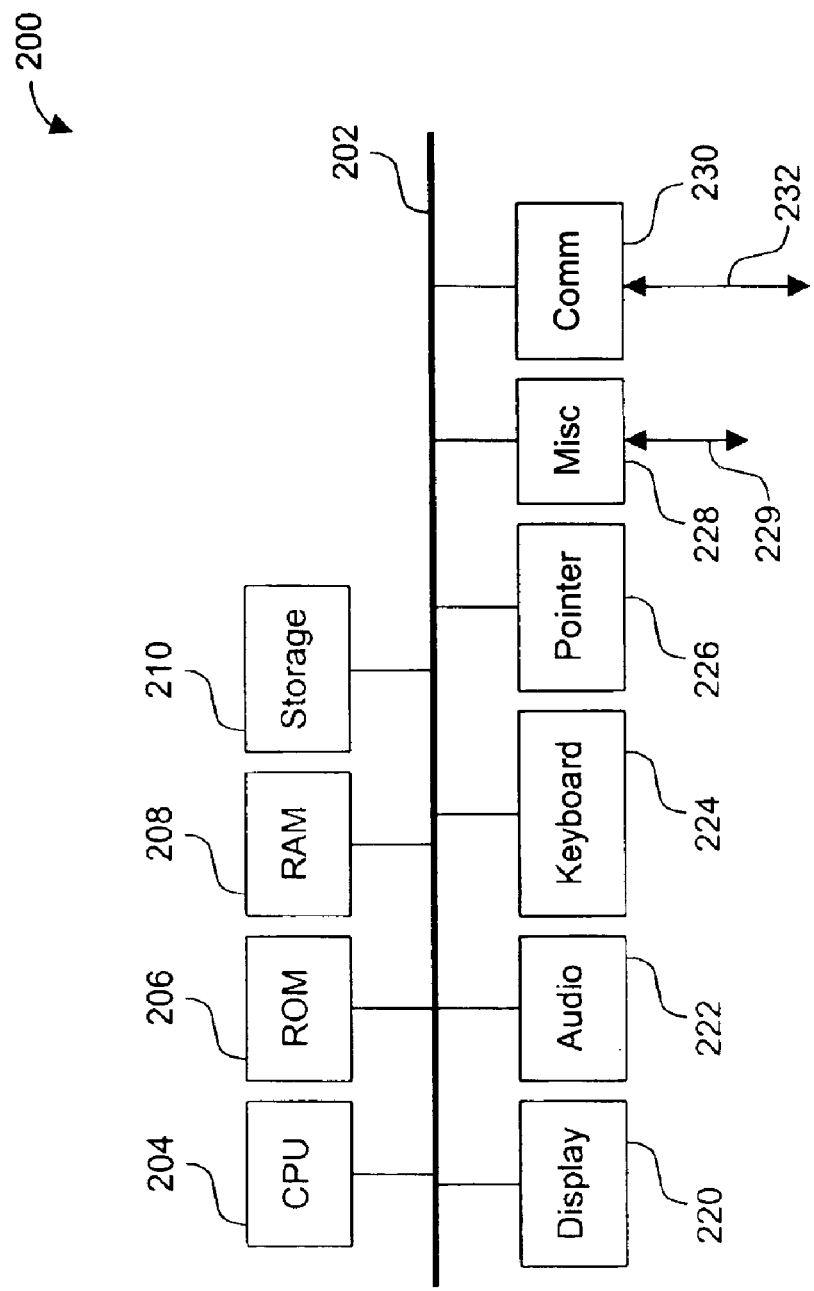
FIG. 2 illustrates one embodiment in block diagram form of a computer system in which the method and/or apparatus of the present invention may be implemented.

FIG. 2 illustrates a computer system 200 in block diagram form, which may be representative of any of the clients and servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

The terms "feasible" class(es) and "possible" class(es) have been used in such a manner that they are considered interchangeable. For example, determining feasible classes may be performed by determining possible classes. Thus, possible classes may be considered feasible classes.

Thus, a method and apparatus for adaptive pixel estimation under high error rate conditions have been described.

What is claimed is:

1. A method for pixel estimation comprising:

determining possible motion classes;

determining possible spatial classes;

determining possible overall classes based on said possible motion and spatial classes;

merging training data from said possible overall classes;

extracting information for a filter estimation from said merged training data;.

forming an optimal filter based on said extracted information; and applying said optimal filter.

2. The method of claim 1 wherein determining said possible motion classes comprises determining a null motion class for stationary images.

3. The method of claim 1 wherein determining said possible spatial classes further comprises:

deriving a threshold from selected pixels near said pixel being estimated; and assigning a binary value based upon how a given known pixel is related to said threshold or assigning both binary values for a given unknown pixel value.

4. The method of claim 1 wherein merging training data from said possible overall classes further comprises merging matrices from said possible overall classes.

5. The method of claim 1 wherein extracting information for said filter estimation further comprises extracting a submatrix for said filter estimation.

6. The method of claim 5 wherein extracting said submatrix for said filter estimation further comprises:

defining a large domain of possible tap positions; and selecting a subset of said possible tap positions.

7. The method of claim 6 wherein said selecting a subset of said possible tap positions further comprises selecting based upon a criteria selected from the group consisting of available computing power for a given K tap positions, and undamaged data for a given tap position.

8. The method of claim 1 wherein forming said optimal filter further comprises forming a least squares optimal filter.

9. A machine-readable medium having stored thereon instructions, which when executed performs a method comprising:

determining possible motion classes;

determining possible spatial classes;

determining possible overall classes based on said possible motion and spatial classes;

merging training data from said possible overall classes;

extracting information for a filter estimation from said merged training data;

forming an optimal filter based on said extracted information; and applying said optimal filter.

10. The machine-readable medium of claim 9, wherein determining said possible motion classes comprises determining a null motion class for stationary images.

11. The machine-readable medium of claim 9, wherein determining said possible spatial classes further comprises:

deriving a threshold from selected pixels near said pixel being estimated; and assigning a binary value based upon how a given known pixel is related to said threshold or assigning both binary values for a given unknown pixel value.

12. The machine-readable medium of claim 9, wherein merging training data from said possible overall classes further comprises merging matrices from said possible overall classes.

13. The machine-readable medium of claim 9, wherein extracting information for said filter estimation further comprises extracting a submatrix for said filter estimation.

14. The machine-readable medium of claim 13, wherein extracting said submatrix for said filter estimation further comprises:

defining a large domain of possible tap positions; and selecting a subset of said possible tap positions.

15. The machine-readable medium of claim 14, wherein said selecting a subset of said possible tap positions further comprises selecting based upon a criteria selected from the group consisting of available computing power for a given K tap positions, and undamaged data for a given tap position.

16. The machine-readable medium of claim 9, wherein forming said optimal filter further comprises forming a least squares optimal filter.

17. A processing system comprising a processor coupled to a memory, which when executing a set of instructions from the memory causes the processor to determine possible motion classes, determine possible spatial classes, determine possible overall classes based on said possible motion and spatial classes, merge training data from said possible overall classes, extract information for a filter estimation from said merged training data, form an optimal filter based on said extracted information, and apply said optimal filter.

18. The processing system of claim 17, wherein the set of instructions further causes the processor to determine a null motion class for stationary images when determining said possible motion classes.

19. The processing system of claim 17, wherein the set of instructions further causes the processor to derive a threshold from selected pixels near said pixel being estimated, and assign a binary value based upon how a given known pixel is related to said threshold or assigning both binary values for a given unknown pixel value when determining said possible spatial classes.

20. The processing system of claim 17, wherein the set of instructions further causes the processor to merge matrices from said possible overall classes when merging training data from said possible overall classes.

21. The processing system of claim 17, wherein the set of instructions further causes the processor to extract a submatrix for said filter estimation when extracting information for said filter estimation.

22. The processing system of claim 17, wherein the set of instructions further causes the processor to define a large domain of possible tap positions, and select a subset of said possible tap positions when extracting said submatrix for said filter estimation.

23. The processing system of claim 17, wherein the set of instructions further causes the processor to select based upon a criteria selected from the group consisting of available computing power for a given K tap positions, and undamaged data for a given tap position when said selecting a subset of said possible tap positions.

24. The processing system of claim 17, wherein the set of instructions further causes the processor to form a least squares optimal filter when forming said optimal filter.

25. An apparatus for pixel estimation comprising:

means for determining possible motion classes;

means for determining possible spatial classes;

means for determining possible overall classes based on said possible motion and spatial classes;

means for merging training data from said possible overall classes;

means for extracting information for a filter estimation from said merged training data;

means for forming an optimal filter based on said extracted information; and means for applying said optimal filter.

* * * * *